Oct. 30, 1956  F. W. TYLER  2,768,661
FILLING DEVICE FOR GREASE GUNS
Filed March 27, 1953  2 Sheets-Sheet 1
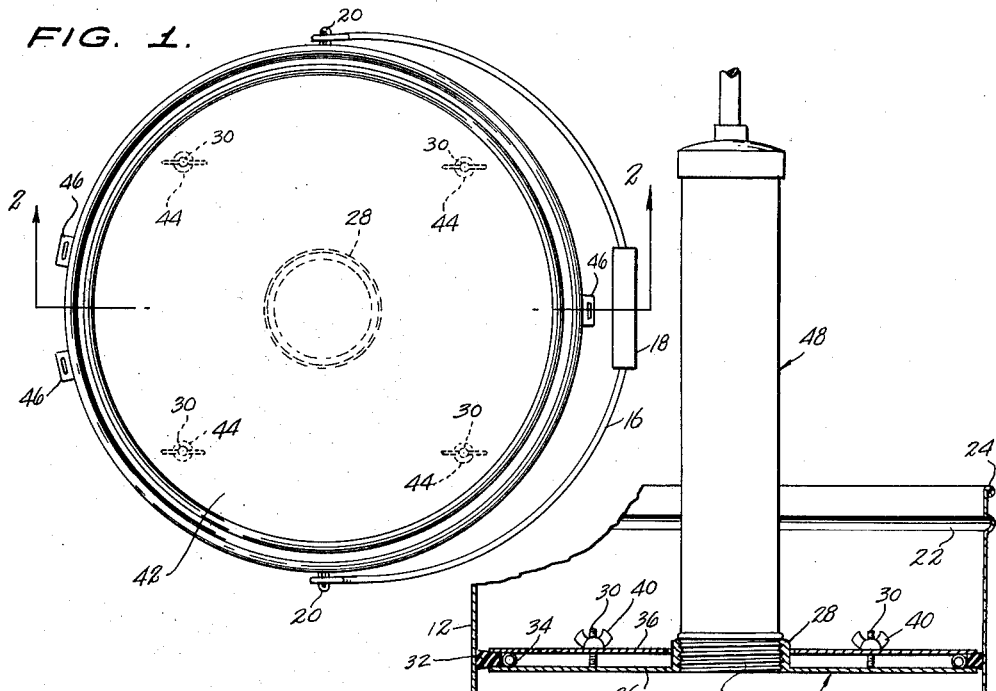
FIG. 1.
FIG. 3.
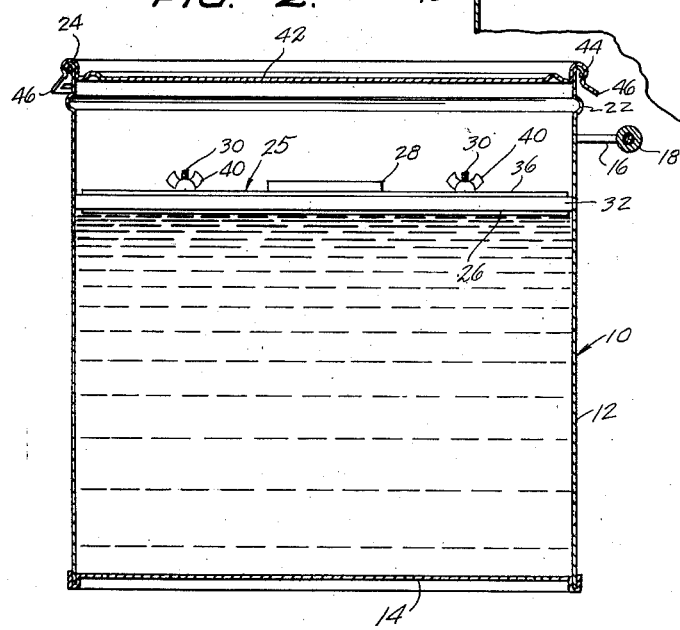
FIG. 2.
INVENTOR.
FLOYD W. TYLER,
BY
McMorrow, Berman + Davidson
ATTORNEYS Oct. 30, 1956   F. W. TYLER   2,768,661
FILLING DEVICE FOR GREASE GUNS
Filed March 27, 1953   2 Sheets-Sheet 2

INVENTOR.
FLOYD W. TYLER,
BY
McMorrow, Berman + Davidson
ATTORNEYS.

United States Patent Office 2,768,661
Patented Oct. 30, 1956

2,768,661

FILLING DEVICE FOR GREASE GUNS

Floyd W. Tyler, Lansford, N. Dak.

Application March 27, 1953, Serial No. 344,965

2 Claims. (Cl. 141—357)

This invention relates to a piston-like assembly insertible in a grease container, and having means for connecting the same to the cylinder of a conventional grease gun, whereby to facilitate refilling or charging of the grease gun from said container.

I am aware of previous filling devices for grease guns, and it has been found that in most instances, the prior art devices have proved expensive, unhandy, and so designed as to cause air to be entrapped within the grease gun cylinder. Additionally, the filling devices of which I have knowledge have, it has been noted, tended toward springing leaks.

The main object of the present invention is to provide an improved filling device which, despite the inexpensive design thereof will nevertheless be capable of being readily associated with wholly conventional grease gun containers and grease guns, the filling device constituting the present invention further being designed to insure the easy, rapid, and efficient filling of the grease gun.

Another object of importance is to provide a filling device as stated in which the piston-like assembly constituting the invention will be so designed as to promote an improved sealing action between the periphery of said assembly and the side wall of the associated grease container. In this way it is proposed to further insure the elimination of air spaces in the grease gun cylinder when the grease has been recharged or filled.

Other objects will appear from the following description, the claims appended thereto, and from the annexed drawings, in which like reference characters designate like parts throughout the several views, and wherein:

Figure 1 is a top plan view of a conventional grease container, equipped with a filling device formed in accordance with the present invention;

Figure 2 is a longitudinal sectional view through said container, taken substantially on line 2—2 of Figure 1, the filling device being shown in edge elevation;

Figure 3 is a fragmentary longitudinal sectional view through the container, the filling device being shown in section and a conventional grease gun being illustrated in side elevation, in operative relationship to said filling device.

Figure 4:
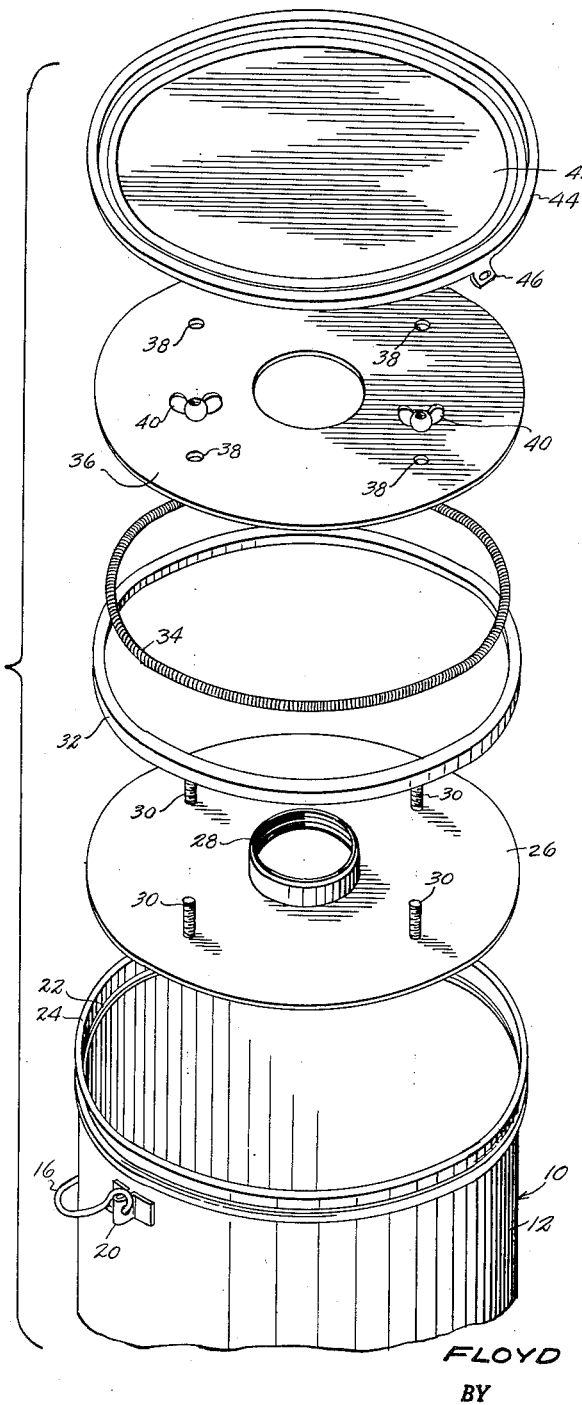
Figure 4 is an exploded perspective view of the container and of the filling device associated therewith.

At 10, I have generally designated a conventional grease container having a cylindrical side wall 12, a permanently closed bottom 14, and a bail 16 provided medially between its ends with a handle 18, and pivotally connected at its ends to the side wall 12 as at 20.

Adjacent its upper end, the side wall 12 is formed with an outwardly struck, peripheral indentation or groove 22, and above said groove, the upper end edge of the side wall 12 is rolled outwardly to form a peripheral bead 24.

All this is conventional construction in a grease container, and does not per se constitute part of the present invention, the illustrated container being merely representative of the type of receptacle with which the filling device constituting the present invention can be effectively used.

My filling device has been designated generally by the reference numeral 25, and includes a circular, flat, relatively thin main plate 26 the outer diameter of which is distinctly less than the diameter of the container in which the filling device is to be inserted. The main plate 26 is formed, centrally thereof, with an upstanding annulus 28 internally threaded to receive the complementarily threaded lower end of a conventional grease gun, in a manner to be made presently apparent.

A circumferential series of equidistantly spaced, upstanding studs 30 is provided upon the main plate 26, said studs being spaced inwardly from the outer periphery of the main plate a short distance and being rigidly secured at their lower ends, in any suitable manner, to the main plate. I believe that under some circumstances, the studs would not have to be fixedly connected at their lower ends to the main plate, and I might, in a commercial embodiment of the invention, instead form stud-receiving openings in the main plate, with the studs extending through said openings and having heads engaging against the underside of the main plate. In this event, of course, suitable sealing means should be used to insure against leakage between the studs and the edges of the openings through which they extend.

Supported upon the periphery of the main plate 26 is an endless, circular, sealing ring or gasket 32 of soft rubber or any other suitably resilient and compressible material found efficient as a leak preventive.

As will be noted from Figure 3, the outer edge of the sealing ring 32 is of greater diameter than the outer diameter of the main plate 26, the inner edge of said ring being formed, however, to a diameter smaller than said diameter of the main plate.

Arranged concentrically with the sealing ring 32 is a spring ring 34, disposed inwardly of the sealing ring in engagement with the inner edge of said sealing ring. Spring ring 34 serves as a centering device for the sealing ring or gasket 32, and also serves to preserve the circular configuration of the sealing ring while urging the sealing ring outwardly to an extent sufficient to cause the outer edge of the sealing ring to be disposed exteriorly of the outer diameter of the main plate.

A clamp or pressure plate has been designated by the reference numeral 36, and is equal in outer diameter to the main plate 26. The clamp plate 36 has a center opening substantially greater in diameter than the outer diameter of the annulus 28, thus to permit the plate 36 to fit relatively loosely about said annulus. Plate 36 is formed with circumferentially spaced, smooth walled openings 38 receiving the upper end portions of the studs 30, and wing nuts 40, threaded upon said upper end portions of the studs, are adapted to be forced against the plates 36, thus to shift said plate 36 in the direction of the main plate 26.

It will be readily seen that when the wing nuts 40 are loosened, the gasket or ring 32 will be placed under compression, and will be resiliently expanded radially of the container 10, thus to be forced into intimate, wiping contact with the inner surface of the side wall 12 of said container.

A container lid has been designated by the reference numeral 42, and is of conventional design, with a rolled peripheral edge 44 forming a downwardly facing groove that receives the bead 24 of the container. Formed upon the margin of the lid 42 are outwardly extended tongues 46. Ordinarily, a grease container of the type shown has a lid provided with tongues 46 extending completely about the container lid. However, I prefer that all but two or three of the tongues 46 be cut off, the remaining tongues serving as latch members. Further the cutting off of all but three tongues provides a cover which can be readily replaced to keep dirt and water out of the lubricant.

A conventional grease gun has been designated generally by the reference numeral 48, and includes the usual elongated cylinder having external threads 50 at one end.

In use of the device, the lid 42 is removed, after which the cylinder of the grease gun is threadedly engaged with the annulus 28. The grease gun of the type shown is provided with a pivoted handle, and to fill the cylinder of the grease gun, it is merely necessary that the handle be pulled outwardly. This fills the cylinder with grease and causes the piston-like plate assembly shown in Figure 3 to move downwardly within container. Thus, no air space is left in the cylinder of the grease gun.

It is important to note that the particular construction of the filling device is such as to cause said filling device to move downwardly within the container while at the same time being held in intimate, wiping contact with the container wall. Leakage of air past the filling device is thus completely prevented, this being very important in view of the desirability of preventing air from entering the grease gun cylinder during the filling thereof.

Further, the particular formation of the filling device is such as to not only permit the device to be inserted in or removed from a container with ease, but also to be swiftly adjusted into a peripherally sealing relationship to said container. The means facilitating insertion or removal of the device is the same as the means for adjusting the device into said sealing relationship, said means comprising the movable clamp plate 36, the resiliently distendable gasket 32, the positioning ring 34, studs 30, and wing nuts 40. Thus, when the device is to be inserted in a container, the wing nuts can be tightened after the filler has been moved downwardly within the container to the level of the lubricant. Loosening of the nuts 40 causes the gasket 32 to be compressed into tight, sealing engagement with the container wall.

When the filling device is to be removed from the container, after exhaustion of the lubricant, the thumb screws are left tight, but of course, if loosening of the thumb or wing nuts will facilitate removal of the device, said loosening can be readily accomplished. In any event, the engagement is such as to permit the adjustment of the peripheral, sealing contact between the filling device and container, as desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A filling device for grease guns comprising a piston insertable within a grease container, said piston including at least one plate formed to a diameter substantially less than the inner diameter of the container so as to space the periphery of said plate away from the inner surface of the container, the plate having a center opening; means extending about said center opening of the plate adapted for connection of a grease gun cylinder to the plate, whereby to force the contents of the grease container through said center opening into said cylinder responsive to movement of the plate downwardly within the container; an annular, radially expandable gasket extending about the periphery of said plate and projecting beyond said periphery with its outer circumference in contact with said inner surface of the container wall, said gasket being of substantially rectangular cross section with a top surface in face-to-face contact with said plate; means extending peripherally of the plate in contact with the inner circumference of said gasket, the gasket being circumposed about said second-named means, and said second-named means normally exerting a continuous, yielding pressure radially and outwardly of the gasket tending to compress the same into sealing engagement with the container wall; and means carried by said plate in face-to-face contact with the bottom surface of the plate adapted to be shifted into engagement with said gasket in a path perpendicular to the lines along which said radially outwardly exerted pressure is directed by the second named means against the gasket, and adapted when engaged with the gasket to frictionally bind the top and bottom surfaces of the gasket against said plate and the last named means respectively, to prevent radial expansion of the gasket under pressure exerted against the gasket by said second-named means.

2. A filling device for grease guns comprising: spaced main and clamp plates proportioned for insertion within a grease container with their peripheries spaced inwardly from the container wall, one of said plates including means disposed centrally thereof for connecting a grease gun cylinder to said one plate, said one plate having a center opening to provide communication between said cylinder and the portion of the container below the plates, thereby to force the contents of the container into the cylinder responsive to downward movement of the plates within the container; a radially expandable, annular gasket extending peripherally of and disposed between the plates with its outer circumference in engagement with the container wall, the gasket being of substantially rectangular cross section with its top and bottom surfaces in face-to-face contact with the respective plates, said plates when shifted toward one another binding frictionally against said top and bottom surfaces of said gasket to prevent radial expansion thereof; an annular spring disposed between the plates, said gasket being circumposed about the spring with its inner circumference in contact therewith, said spring being tensioned to exert pressure radially and outwardly of the gasket tending to expand the same radially into sealing engagement with the container wall; and an adjustable connection extending between the plates adapted for shifting the plates toward and away from one another into and out of said engagement with said top and bottom surfaces of the gasket, in a path perpendicular to the lines along which said radial pressure is directed against the gasket.

References Cited in the file of this patent

UNITED STATES PATENTS

| | | |
|---|---|---|
| 738,531 | Dolsen | Sept. 8, 1903 |
| 1,689,360 | Monnot | Oct. 30, 1928 |
| 1,699,873 | Brodsky | Jan. 22, 1929 |
| 1,714,482 | Schmuziger | May. 21, 1929 |
| 1,767,711 | Solenberger | June 24, 1930 |
| 2,083,590 | Barks | June 15, 1937 |
| 2,517,551 | Eckman | Aug. 8, 1950 |